United States Patent [19]
Botterill et al.

[11] Patent Number: 5,106,349
[45] Date of Patent: Apr. 21, 1992

[54] DIFFERENTIAL UNIT

[75] Inventors: John R. Botterill, Saarbrücken; Helmut Mildt; Gerald Kühn, both of Cologne, all of Fed. Rep. of Germany

[73] Assignee: GKN Automotive AG, Siegburg, Fed. Rep. of Germany

[21] Appl. No.: 525,915

[22] Filed: May 18, 1990

[30] Foreign Application Priority Data

May 18, 1989 [DE] Fed. Rep. of Germany ....... 3915959

[51] Int. Cl.⁵ .............................................. F16H 1/44.5
[52] U.S. Cl. ....................................... 475/150; 74/567; 192/93 A; 475/239
[58] Field of Search ............... 475/150, 237, 238, 239, 475/249; 74/567; 192/93 A

[56] References Cited

U.S. PATENT DOCUMENTS

| | | | |
|---|---|---|---|
| 2,091,270 | 8/1937 | Colman | 192/93 A |
| 2,574,204 | 11/1951 | Woody et al. | 192/93 A |
| 2,661,826 | 12/1953 | Hendrickson et al. | 192/93 A |
| 2,848,086 | 8/1958 | Warsaw | 192/93 A |
| 3,791,501 | 2/1974 | Culbertson | 74/567 X |
| 4,679,463 | 7/1987 | Ozaki et al. | 475/86 |
| 4,683,998 | 8/1987 | Cogdem et al. | 192/93 A X |
| 4,741,407 | 5/1988 | Torii et al. | 475/86 X |
| 4,805,486 | 2/1989 | Hagiwara et al. | 475/150 |
| 4,838,118 | 6/1989 | Binkley | 475/150 X |

Primary Examiner—Dwight Diehl
Attorney, Agent, or Firm—Toren, McGeady & Associates

[57] ABSTRACT

A differential unit comprises a differential carrier (12) supported in a housing (1) for rotation; output elements (16, 17) differentially rotatable relative to the carrier and connected to respective output shafts, differential gears connecting the output elements, and a friction assembly comprising a number of plates (22) rotationally fast with one element of the differential interleaved with a number of plates (24) rotationally fast with another element of the differential, the friction plates being axially loadable into frictional engagement with one another to restrict the differential rotation of the output elements. The friction plates are loadable by an actuating mechanism comprising an abutment ring (54) fixed in the housing and an actuating ring (28) movable angularly and axially relative thereto, with cam surfaces provided by circumferentially extending variable depth grooves (47, 48) in the rings with balls (49) therebetween engaging the grooves. The cam grooves are arranged so that on angular movement of the actuating ring initially the rate of change of axial position thereof is high and then becomes lower with further angular movement.

12 Claims, 11 Drawing Sheets

DIFFERENTIAL UNIT

BACKGROUND TO THE INVENTION

1. Field of the Invention

This invention relates to a differential unit, particularly suitable for use in motor vehicles as described hereafter, which incorporates a controllable friction assembly for restricting the differential action of the unit.

More particularly, the invention relates to a differential unit comprising:

a housing;

a drivable differential carrier supported in the housing for rotation about an axis;

two output elements rotatable about said axis relative to the differential carrier and connected to respective output shafts;

differential gears rotatably supported by the differential carrier and having driving connection with the output elements to permit differential rotation thereof;

a friction assembly comprising a number of plates rotationally fast with one element of the differential rotatable about said axis, interleaved with a number of plates rotationally fast with another element of the differential rotatable about said axis, and actuating means for axially loading the plates into frictional engagement with one another to restrict said differential rotation of the output elements;

the actuating means comprising an abutment ring fixed relative to the housing, an actuating ring movable axially and angularly relative thereto, and means for causing axial movement of the actuating ring upon said angular movement thereof. Such a differential unit will hereafter be referred to as a differential unit of the kind specified.

2. Description of the Prior Art

A differential unit of the kind specified is disclosed in JP 62-196951A. The cam means operative between the abutment ring and actuating ring comprises opposed circumferentially extending grooves in the rings, with balls engaged in each facing pair of grooves. The depth of the grooves varies linearly as the grooves extend circumferentially. This produces a problem, in that the inclination of the grooves must be limited in order to provide reasonable controllability of the friction assembly, with the result that when the friction plates wear there may not be sufficient axial movement available to the actuating ring to load and operate the friction assembly satisfactorily.

SUMMARY OF THE INVENTION

It is the object of the present invention to provide a differential unit of the kind specified in which the actuating means provides for rapid response and a high degree of controllability.

According to the invention, we provide a differential unit of the kind specified wherein said means for causing axial movement of the actuating ring comprises circumferentially extending cam surfaces operative between opposed faces of the abutment ring and actuating ring, to produce said axial movement of the actuating ring upon angular movement thereof, said cam surfaces being arranged to provide a relationship between the axial position of the actuating ring relative to the angular position thereof which is at least partially non-linear, such that from a starting position of the actuating ring the rate of change of axial position thereof, as a function of angular movement thereof, is initially high and then becomes lower.

In a differential unit according to the invention, the initial relatively large axial component of movement of the actuating ring produced by an increment of angular movement thereof, from the starting position wherein the friction plates are completely disengaged and unloaded, results in a rapid take up of any clearances between the friction plates, while no significant reaction forces therebetween need to be overcome. The response speed of the friction assembly of the differential unit is thus improved. Thereafter, as the axial movement of the actuating ring produced by an increment of angular movement thereof decreases, preferably progressively, the frictional force can be more finely controlled. Hence the restriction of the differential action of the differential unit can be more finely controlled from a small degree of restriction possibly up to complete locking of the output elements of the unit relative to one another.

The actuating ring and abutment ring may be provided with facing pairs of circumferentially extending spaced grooves, with the grooves of each pair increasing in depth in opposite circumferential directions, whilst a plurality of rolling members, preferably balls, are provided one in each facing pair of grooves. This provides advantageous frictional conditions between the rings. The change in pitch may be expressed mathematically in the following formula:

$$\frac{dy}{dx} = \frac{c_1 a}{c_1 x} + c_2 \text{ and } \frac{dy}{dx} = b - ax \text{ respectively,}$$

with y being the axially effective change in height of each surface, x respective distance in the circumferential direction along each surface, a,b,c, $c_1$, $c_2$ being constants. There is obtained a profile in accordance with the expressions $$y = a \ln (c_1 x + c_2) + b, \text{ and } y = bx - \frac{ax^2}{2} + c \text{ respectively}$$

There remain to be determined the initial and final inclination angles of the surfaces. With opposed grooves in the faces of the abutment ring and actuating ring with balls engaging respective pairs of facing grooves, an initial angle of inclination in the range 6° to 9° and a final angle of inclination in the range 1° to 1.5° is suitable. The final or runout angle may be constant as far as the end of the grooves. In this way it is ensured that for all conditions of wear of the friction plates the friction assembly operates with the same characteristics.

Preferably there is provided, between the actuating ring and abutment ring, an annular or disc-like cage which has apertures extending through it, receiving the balls and thus ensuring that all the balls move synchronously with one another.

The grooves engaged by the balls may be disposed at a constant radius relative to the axis of the differential unit, with the change in relationship between angular and axial movement of the actuating ring, according to the invention, achieved simply by appropriate configuration of the inclination of the grooves. In another embodiment, the inclination of the grooves may be constant along their length, whilst the grooves are disposed in such a way that they extend radially as well as circumferentially, so that as a function of the angular position of the actuating ring, the axial displacement rate thereof is changed. It is of course possible to provide a combination of these two configurations of groove. Preferably there are provided at least three facing pairs of grooves and rolling members engaging therein. The deepest parts of the grooves serve as return stops for limiting the movement of the actuating ring relative to the abutment ring in one direction.

Such an arrangement of the actuating means requires only a relatively small number of components, and thus is axially compact.

The rotatable elements of the differential unit with which the plates are respectively rotationally fast may be the output elements thereof, directly connected to the output shafts, i.e. one set of plates is not connected to the differential carrier. An extremely compact assembly is achieved, which is particularly advantageous for front wheel drive vehicles with transversely installed engines. The advantage of the axial dimension is achieved because, being operative directly between the output elements of the differential, the friction assembly does not have to generate very large forces to inhibit relative rotation of the output elements, and therefore fewer friction plates need be provided.

The means for effecting angular movement of the actuating ring may comprise an at least single stage reduction gear driven by a motor, preferably an electric motor. By selecting an electric motor, a particularly advantageous control system may be provided. By incorporating a reduction gear, the size of the electric motor can be reduced. Such reduction in the size of the electric motor does not, within limits reduce the performance with respect to the actuation of the friction assembly to inhibit the differential action of the differential unit. In order to achieve a reaction time of 150 milliseconds (with a reduction gear ratio of 1:50 and an angle of inclination of the ball-receiving grooves of 1.5°) an electric motor of up to 250 watts output power is sufficient for the differential unit for a heavy passenger car.

In order to provide a reduction gearing, the actuating ring may have its outer periphery provided with teeth engaging a toothed pinion driven by the electric motor. In this way, it is quite possible to dispose the electric motor outside the housing of the differential unit. The toothed pinion and actuating ring may be helically toothed.

If the pinion engaging the actuating ring is itself connected to the electric motor by a reduction gearing, a total reduction gear ratio up to approximately 100:1 may be provided. In this way it is possible to use a conventional electric motor, at reduced cost.

Preferably the actuating ring is required to move angularly through less than 180°. With such a small angular movement, even when a reduction gear has been incorporated between the electric motor and actuating ring, the required response time, from switching on the motor until the differential action is restricted, remains acceptable. To meet the requirements of an anti-locking braking system, short release times of approximately 100 milliseconds may be required, and if necessary these may be achieved by reversing the polarity of the motor, to drive the motor and thus the actuating ring in the opposite direction.

However, to ensure a return movement of the actuating ring to relieve the axial load on the plates of the friction assembly if, due to some failure, the electric motor is no longer capable of achieving this, there may be provided one or more return springs. These springs may take the form of spiral springs, preferably associated directly with the shaft of the electric motor or with an intermediate shaft.

A further possibility is that a switchable free-wheeling unit may be provided in the reduction gearing connecting the electric motor to the actuating ring, the free wheeling unit being operable so that when the motor is actuated it locks the motor or gearing against return movement of the actuating ring. When actuation of the motor is discontinued to permit return movement of the actuating ring, the reduction gearing is disconnected from the motor.

With such a design it may be sufficient to design the motor so as to rotate in one direction only, i.e. not to provide for a return movement. Return of the actuating ring may be effected by a return spring.

Axial movement of the actuating ring may be transmitted to the friction plates by way of tappets extending axially through the differential carrier, and operable on a pressure plate within the differential carrier to urge the plates into frictional engagement with one another, the tappets being movable axially by the actuating ring through the intermediary of a thrust bearing.

In the embodiments described hereafter, further thrust bearings may be introduced into the system where axial movement has to be transmitted between parts which are relatively rotating in use, in order to reduce frictional effects to a minimum.

BRIEF DESCRIPTION OF THE DRAWINGS

The invention will now be described by way of example with reference to the accompanying drawings, of which.

DESCRIPTION OF PREFERRED EMBODIMENTS

Figure 1:
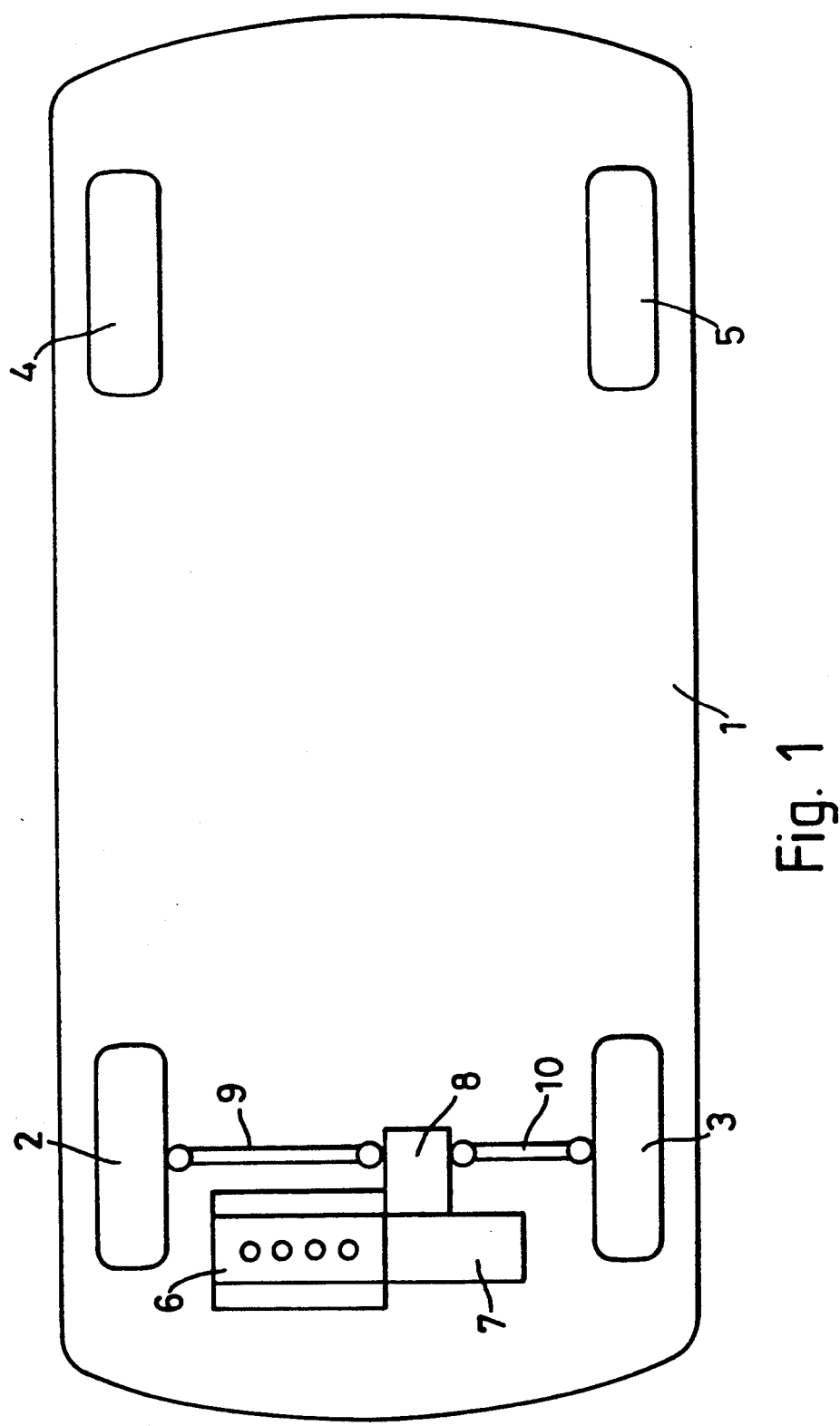
FIG. 1 shows diagrammatically the driveline layout of a front wheel drive vehicle.

Referring firstly to FIG. 1 of the drawings, this shows in diagrammatic outline plan view a vehicle 1 having a pair of front wheels 2, 3 and a pair of rear wheels 4, 5. The vehicle is a front wheel drive vehicle, having an engine 6, gearbox 7, and differential unit 8 from which driveshafts 9, 10 extend to the front wheels.

Figure 2:
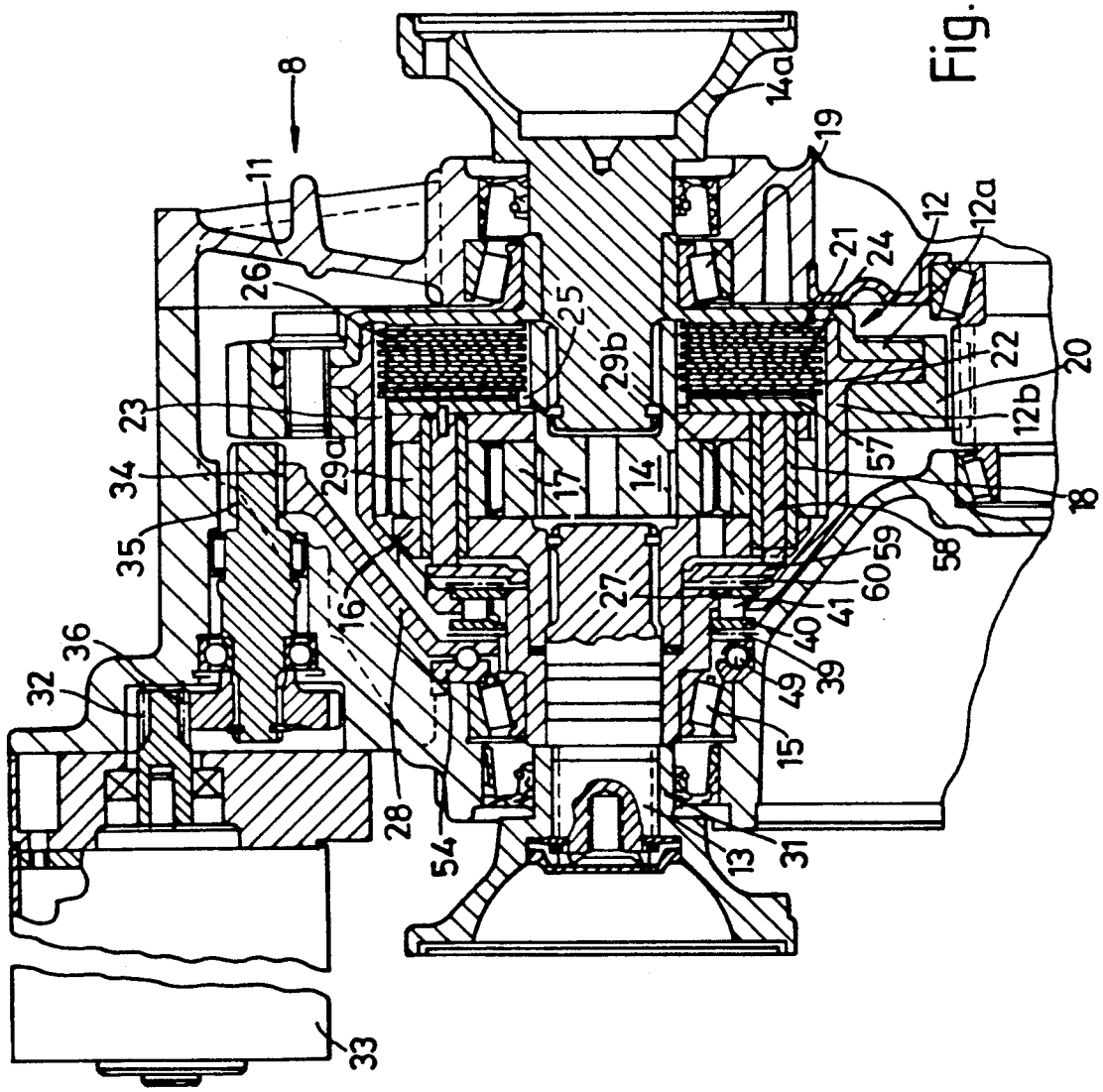
FIG. 2 is a part section through a first embodiment of differential unit according to the invention for use in the vehicle driveline shown in FIG. 1.
Figure 3:
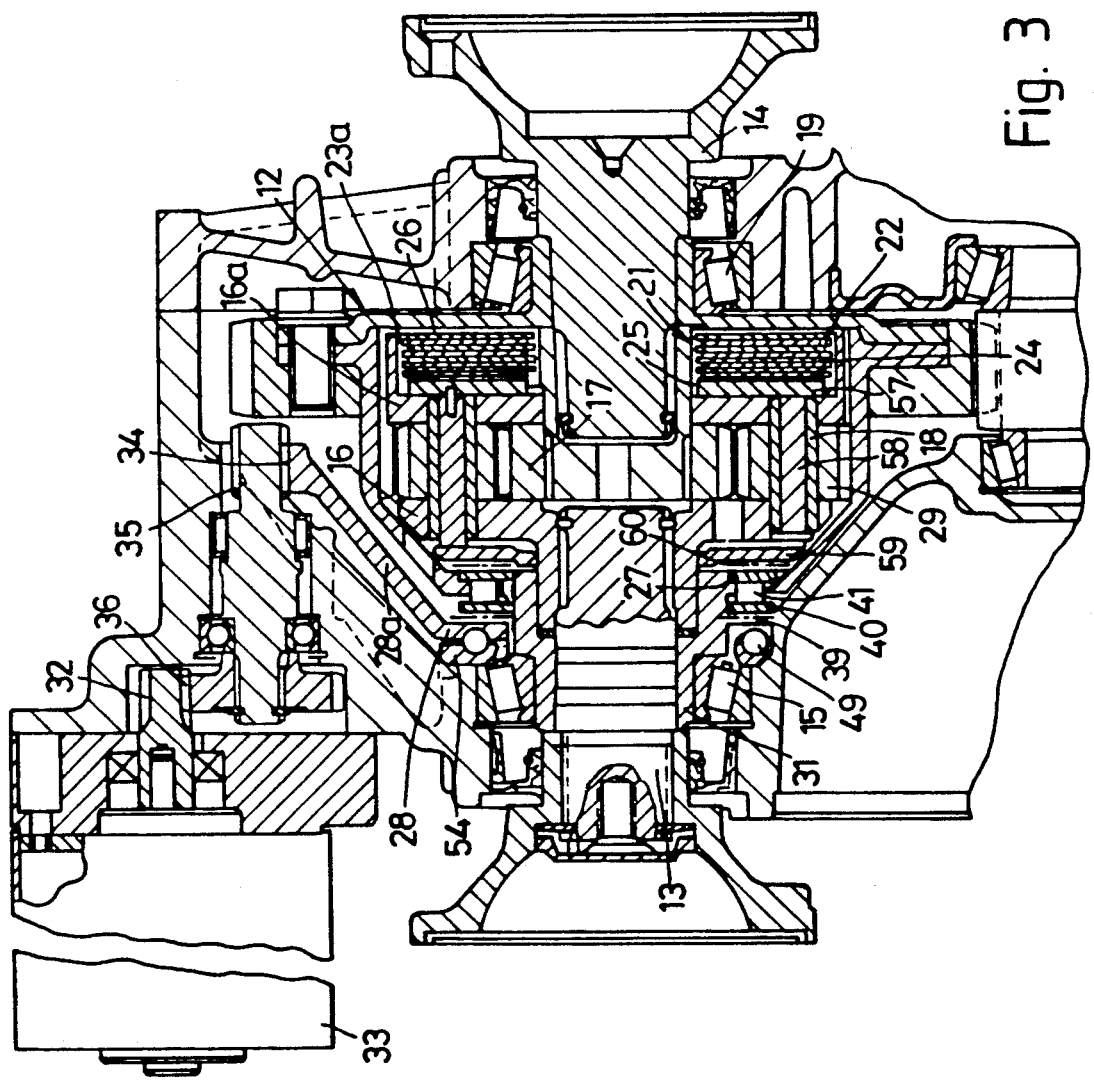
FIG. 3 is a part section through a further embodiment of differential unit according to the invention, for use in the drive line of FIG. 1.
Figure 5:
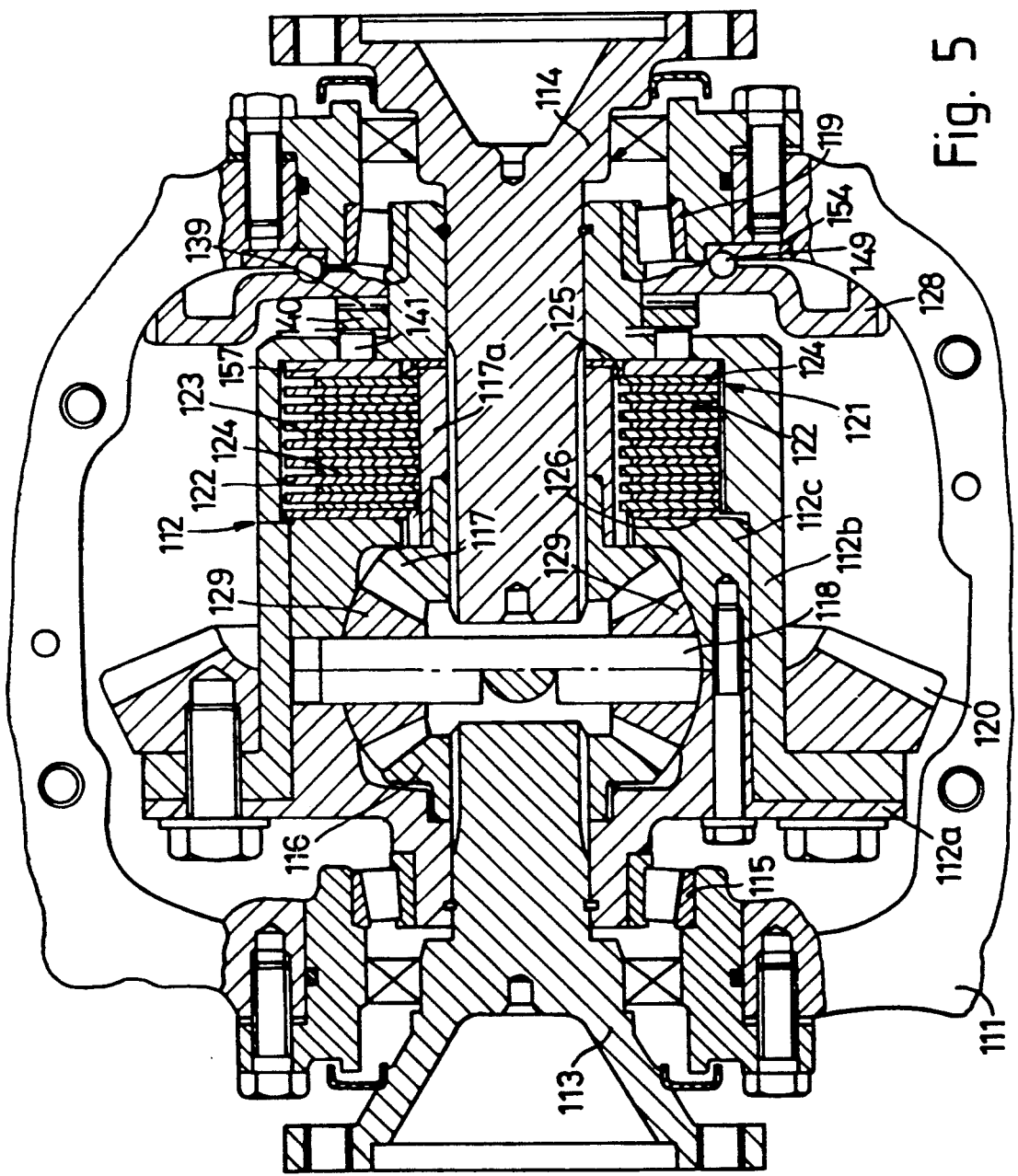
FIG. 5 is a part section through a further embodiment of differential unit according to the invention, for use in the driveline shown in FIG. 4.
Figure 6:
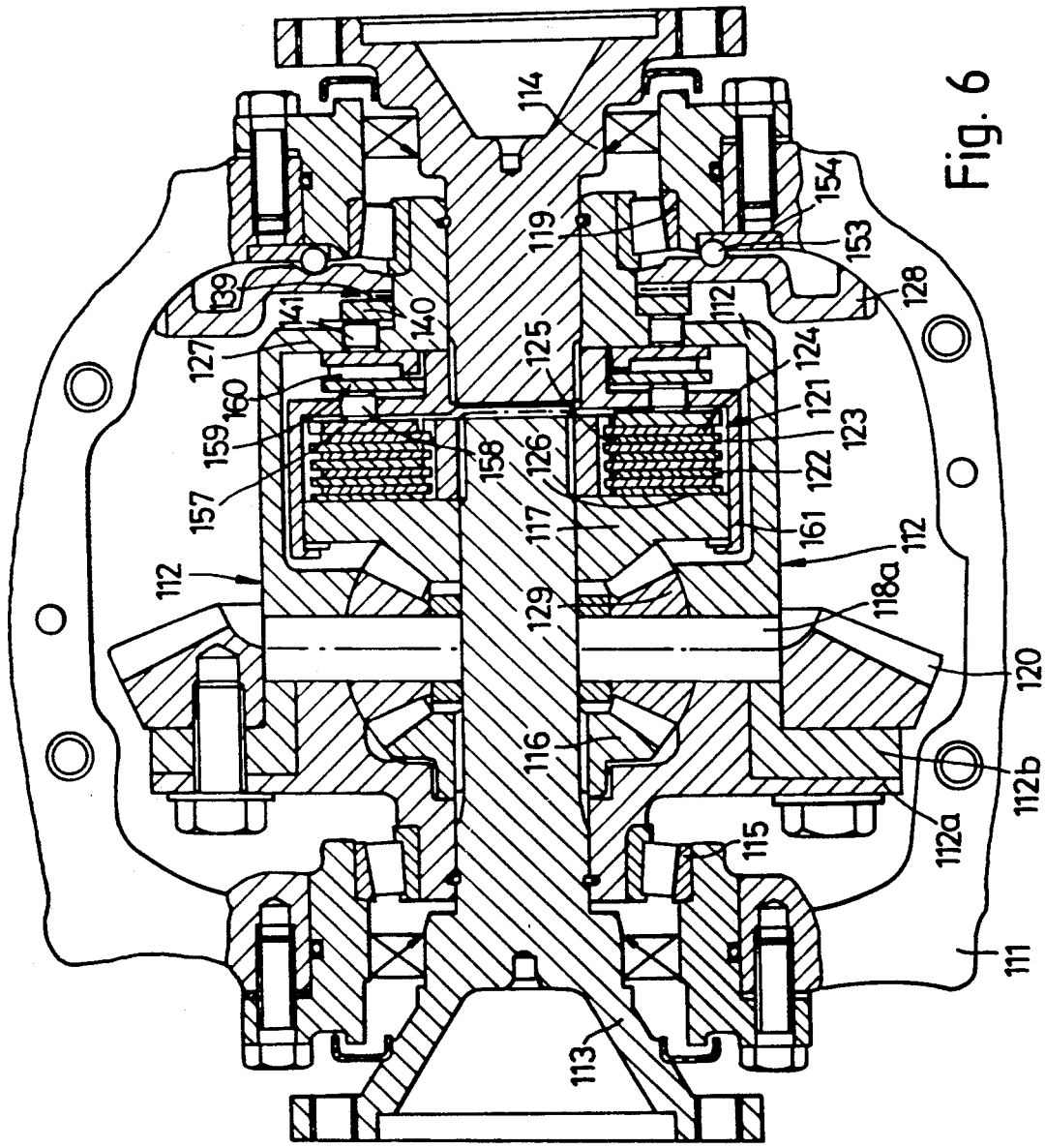
FIG. 6 is a part section through yet a further embodiment of differential unit according to the invention, for use in the driveline of FIG. 4.

Differential units which may be used in the vehicle shown in FIG. 1 are illustrated in FIGS. 2 and 3. These show differential units in which the necessary differential action is obtained by planetary gearing arrangements. FIGS. 5 and 6 show differential units in which the differential action is obtained by the use of gearing of bevel gear type, and although the differential units of FIGS. 5 and 6 are designed so as to be suitable for a rear wheel drive vehicle as described hereafter, it will be appreciated that with suitable modification these differential units may alternatively be used in a front wheel drive vehicle.

Referring now to FIG. 2 of the drawings, the differential unit there shown comprises a housing 11 within which is rotatably supported, by taper roller bearings 15, 19, a differential carrier 12. The differential carrier 12 is of divided construction, its two parts being joined at a flange to which is secured a driving gear 20 by which the differential carrier is driven from the gearbox of the vehicle. The gearbox is provided with a suitable gear shown in outline in FIG. 2 meshing with the driving gear 20.

The differential carrier 12 supports, for rotation relative to the carrier about the axis on which the carrier itself is rotatable, two output elements in the form of a planet carrier 16 and a sun gear 17, of which the former has a splined torque transmitting connection to a first output shaft 13 provided with a drive flange 31, and the latter is received on a second output stub shaft 14 connected to the spigot of a drive flange element 14a. The drive flanges serve to connect the outputs of the differential to the driveshafts 9, 10.

As above referred to, the differential carrier 12 is in two parts which are indicated at 12a, 12b. The part 12b is internally toothed at 23. The planet carrier 16 carries six circumferentially spaced hollow journals 18 on which are rotatably received planet gears. The planet gears are arranged in pairs, each pair comprising a gear 29a meshing with the sun gear 17 and a gear 29b meshing with the internal teeth 23 of the differential carrier part 12b, the gears 29a and 29b of each pair meshing with one another. The section in which FIG. 2 is taken shows one of the gears 29a and one of the gears 29b. Thus a driving connection is provided from the drive gear 20 to the output elements of the differential unit, with the necessary ability being provided for differential rotation between the output elements.

The differential unit incorporates a friction assembly 21 comprising a number of plates 22 interleaved with plates 24. The plates 22 have teeth on their external periphery, engaging extensions of the internal teeth 23 in the carrier part 12b with which the planet gears 29b engage. The plates 24, each being disposed between two plates 22, have their internal circumference provided with teeth engaged with complementary teeth 25 provided on the exterior of a sleeve-like extension of the output stub shaft element 14. The plates 22, 24 are able to move axially on their respective teeth so that when an axial force is applied to the assembly of plates a braking action is obtained between the output element and the differential carrier. If required freely rotatable intermediate plates may be disposed between adjacent plates 22, 24.

An axially endmost one of the plates 22, 24 forming the friction assembly 21 abuts a supporting face 26 on the part 12a of the differential carrier 12. At the opposite end of the friction assembly, one of the plates is engageable by a pressure plate 57. Tappets 58 pass through the hollow planet gear-supporting journals 18, and engage the pressure plate 57. At their other ends, the tappets are contacted by a thrust plate 59. A further thrust plate 27 is operable on the thrust plate 59 with the intermediary of a thrust bearing 60. The thrust plate 27 is operable upon by yet a further thrust plate 40 by way of tappets 41 which extend through apertures in the carrier part 12b, and these tappets 41 may provide for adjustment of the distance between the thrust plates 27, 40. The thrust plate 40 is in turn operable on by a rotatable actuating ring 28 with the interposition of yet a further thrust bearing 39, to reduce frictional effects to a minimum. It will be appreciated that the thrust plate 40 rotates with the differential carrier 12, whilst the actuating ring 28 is only angularly movable through substantially less than half a revolution, as described hereafter.

An abutment ring 54 lies against an internal surface of the housing 11 adjacent the bearing 15. The abutment ring is provided with cam surfaces in the form of a number of spaced circumferentially extending grooves or indentations which face complementary such grooves or indentations in the actuating ring 28, and a plurality of balls 49 are disposed one in each facing pair of such grooves or indentations. The grooves have an axial depth which varies as they extend circumferentially so that angular movement of the actuating ring produces an axial movement thereof. The precise configuration of the grooves according to the present invention will be described in greater detail hereafter.

The actuating ring 28 has an extension 28a which extends radially and axially and ends in an arcuate portion with external teeth 34 which may be helical. These are engaged by a pinion 35 provided on the end of a shaft rotatably supported in the housing 11, the other end of the shaft being drivable by an electric motor 33 through a reduction gearing 32, 36. Thus operation of the electric motor 33 produces the angular movement of the actuating ring 28, to produce axial movement of the latter and hence, through the various thrust rings and tappets above described, movement of the pressure plate 57 to bring the plates 22, 24 into frictional engagement with one another to inhibit or completely lock, depending on the pressure applied, the differential action of the differential unit.

Referring now to FIG. 3 of the drawings, this shows a differential unit of which certain parts are identical to those shown in FIG. 2, and which are therefore accorded the same reference numerals. It differs from the unit shown in FIG. 2 only in respect of the rotatable element of the differential which is engaged by the plates 22. The plates 22, which have external teeth as above described, engage with internal teeth 23a provided in a sleeve extension of a member 16a which receives the ends of the hollow journals 18 opposite to the ends thereof held by the planet carrier 16. Since the planet carrier 16 forms one of the output elements of the differential, the friction assembly of plates 22, 24 thus provides its braking effect directly between the output elements of the differential unit rather than between one of the output elements and the input element (the differential carrier) thereof. Because of such direct application of the braking effect of the friction assembly to inhibit or lock the differential action of the unit, a lower braking torque needs to be exerted by the friction assembly in the FIG. 3 embodiment as compared with the FIG. 2 embodiment, and hence fewer plates 22, 24 need to be provided.

Figure 4:
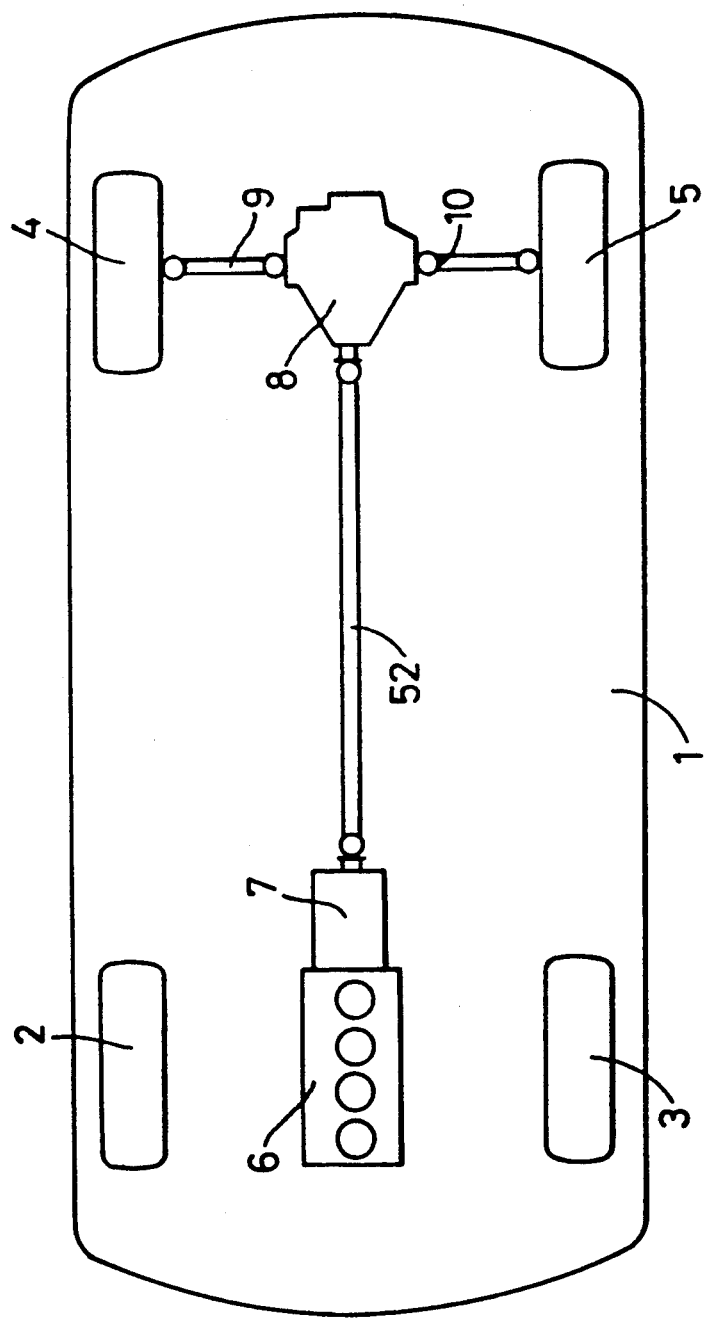
FIG. 4 shows diagrammatically the driveline arrangement of a rear wheel drive vehicle.

Referring now to FIG. 4 of the drawings, this shows in diagrammatic plan view a rear wheel drive motor vehicle. As in the embodiment of FIG. 1, it has front wheels 2, 3; rear wheels 4, 5; an engine 6; gearbox 7; a differential unit 8, and driveshafts 9, 10. In this case, however, there is a propeller shaft 52 leading from the gearbox 7 to the differential unit 8 which is of course rear mounted to drive the rear wheels.

FIGS. 5 and 6 show different embodiments of bevel gear type differential units suitable for use in the rear wheel drive vehicle.

The differential unit shown in FIG. 5 comprises a housing 111 within which there is rotatably supported, by bearings 115, 119, a differential carrier 112. The differential carrier 112 has a flange to which is bolted a crown wheel 120 to be engaged by a driving pinion (not shown) rotatable about an axis perpendicular to the axis of rotation of the carrier 112.

The carrier 112 comprises three components 112a, 112b, and 112c. The component 112b is generally cup-shaped, whilst the component 112a secured to the component 112b (by the bolts which hold the crown wheel 120) closes the open end of the component 112b. Component 112c fits within the component 112b being secured to the closure part 112a by further bolts. The parts 112a, 112c support two transversely extending pins at right-angles to one another, one of which is indicated at 118. The pins support bevel differential gears 129, which mesh with side gears 116, 117 which form the output elements of the differential unit. The side gears 116, 117 are connected to output shafts 113, 114 provided with drive flanges for connection to the driveshafts 9, 10.

A friction assembly 121 is disposed in the differential carrier, comprising interleaved friction plates 122, 124 of which the plates 122 are rotationally fast with the carrier part 112b having toothed engagement therewith at the outer periphery of the plates, whilst the plates 124 are rotationally fast with the output element 117 and output shaft 114, having toothed engagement at the inner periphery of the plates with a sleeve 117a splined to the output shaft 114. An end one of the plates 122 abuts a surface 126 on the carrier part 112c, whilst the opposite end one of the plates 124 abuts a pressure plate 157. Tappets 141 extend through the carrier part 112b to abut a thrust ring 140 which is operable upon by an actuating ring 128 with the intermediary of a thrust bearing 139. The actuating ring 128 carries external teeth to move the actuating ring angularly by an electric motor and reduction gear, not shown but generally as above described in relation to FIGS. 2 and 3. Axial movement of the actuating ring 128 upon angular movement thereof is provided by an abutment ring 154 facing the actuating ring, these rings having oppositely inclined grooves therein and balls 149 received therein all as above described.

The differential unit shown in FIG. 6 is generally the same as that shown in FIG. 5, with the same reference numerals used for corresponding parts. The difference is that in the embodiment of FIG. 6 the output shaft 113 is of sufficient length to extend through the side gear 117 and engage a sleeve 117a with which the plates 124 are rotationally fast. The plates 122 are rotationally fast with an external sleeve 161 fitting on the outside of side gear 117, which sleeve 161 serves for torque transmission to the output shaft 114 which is shorter than the corresponding shaft in the embodiment of FIG. 5. The differential carrier 112 is of different construction from the FIG. 5 embodiment, comprising only two parts 112a, 112b, and the bevel differential gears 129 are supported on short individual pins 118a.

In the embodiment of FIG. 6, there is an abutment ring 154 and actuating ring 128, with balls 153 engaging opposed circumferentially extending recesses of variable axial depth therein, as in the embodiment of FIG. 5. The axial movement of the actuating ring 128 is, however, transmitted to a pressure plate 157 engaging the plates 122, 124, through the intermediary of tappets 158, thrust ring 159, thrust bearing 160, further tappets 141 which extend through the carrier part 112b, and a further thrust ring 140 and thrust bearing 139.

FIGS. 7 to 10 of the drawings show diagrammatically and in greater detail the construction and mode of operation of the actuating ring and abutment ring, cam surfaces therebetween, and associated components, applicable to all the embodiments described above.

Figure 7:
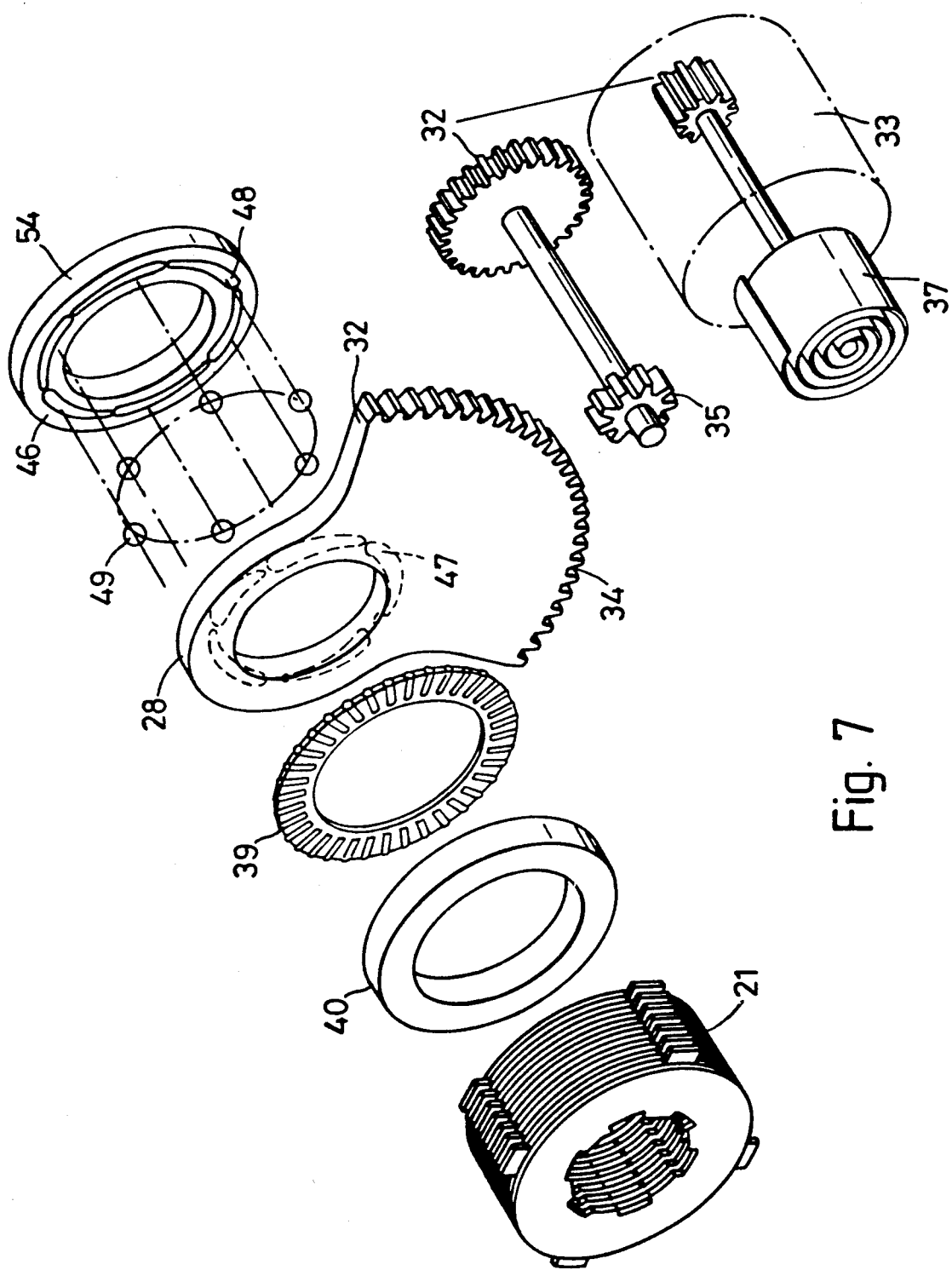
FIG. 7 is an exploded perspective view of an actuating mechanism for a differential unit, to which the invention may be applied.

FIG. 7 shows the actuating ring 28 with a lateral extension having a part-circular peripheral portion with gear teeth 34. The actuating ring is movable angularly by an electric motor 33 which is reduction geared via an intermediate geared shaft 35 to the actuating ring. The electric motor is shown with a spiral return spring 37. The abutment ring is shown at 54, and in its face 46 facing the actuating ring there are visible the cam surfaces constituted by circumferentially extending grooves 48 of changing axial depth, facing complementary grooves 47, whose depth changes in the opposite circumferential sense, in the actuating ring. Balls 49 between the abutment ring and actuating ring are disposed one in each facing pair of the grooves. Also shown in FIG. 8 is a thrust bearing, thrust ring and assembly 21 of friction plates, although it will be appreciated that in some of the embodiments described above there are several thrust bearings and thrust rings interposed between the actuating ring and friction assembly.

Figure 8:
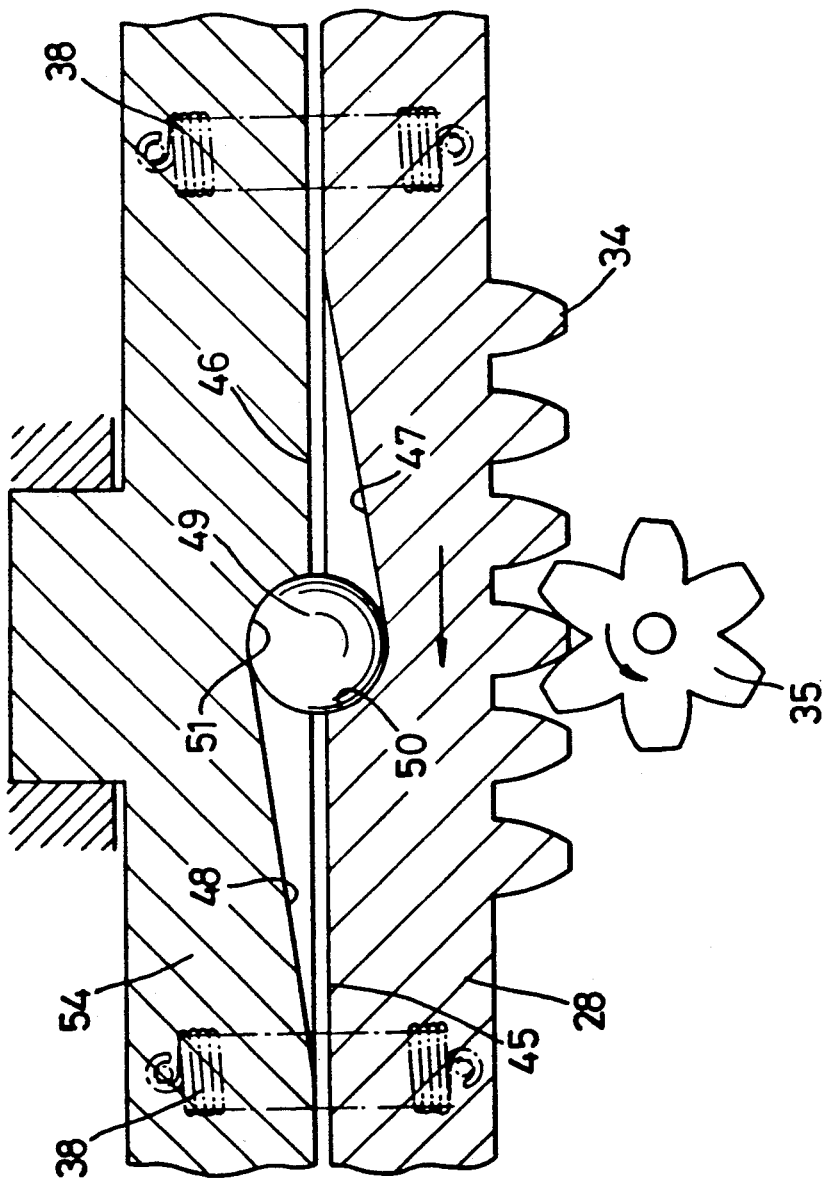
FIGS. 8 and 9 are sections through part of the mechanism of FIG. 7, in different operative conditions.

FIG. 8 shows diagrammatically one facing pair of grooves 48, 47 in the abutment ring 54 and actuating ring 28. This is a developed view of part of the circumference of the two rings. The opposite circumferential directions in which the depth of the grooves 48, 47 varies is clearly visible, and at their ends at which they are deepest the grooves provide stop faces 51, 50 which limit the angular movement of the actuating ring relative to the abutment ring in one direction. It will be appreciated that, when the actuating ring is moved angularly relative to the abutment ring, as illustrated in FIG. 9 and caused by the gear pinion 35 engaging teeth 34 on the actuating ring, the two rings are moved axially apart from one another.

Figure 9:
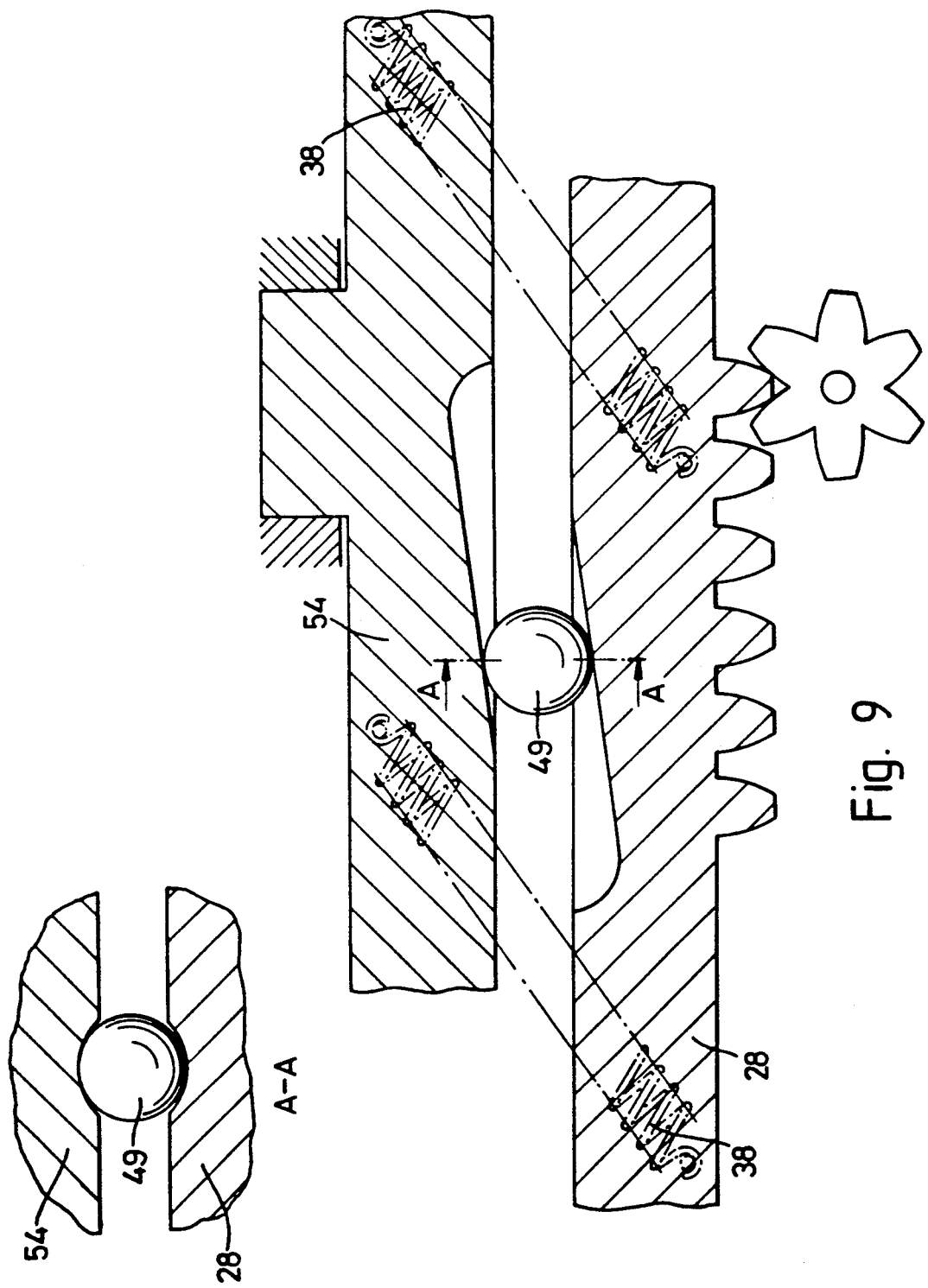

FIGS. 8 and 9 show springs 38 connected between the abutment ring 54 and adjusting ring 28. These springs provide for return of the two rings to the relative position shown in FIG. 8, wherein balls 49 therebetween gauge the stop faces 50, 51 at the deepest ends of the grooves. The springs 38 are an alternative to the provision of a spiral spring as shown at 37 on the shaft of the electric motor 33 in FIG. 7.

The inset to FIG. 9 shows, in a transverse cross-section as indicated at A—A, a ball 49 engaging the grooves in the abutment ring and actuating ring.

Figure 10:
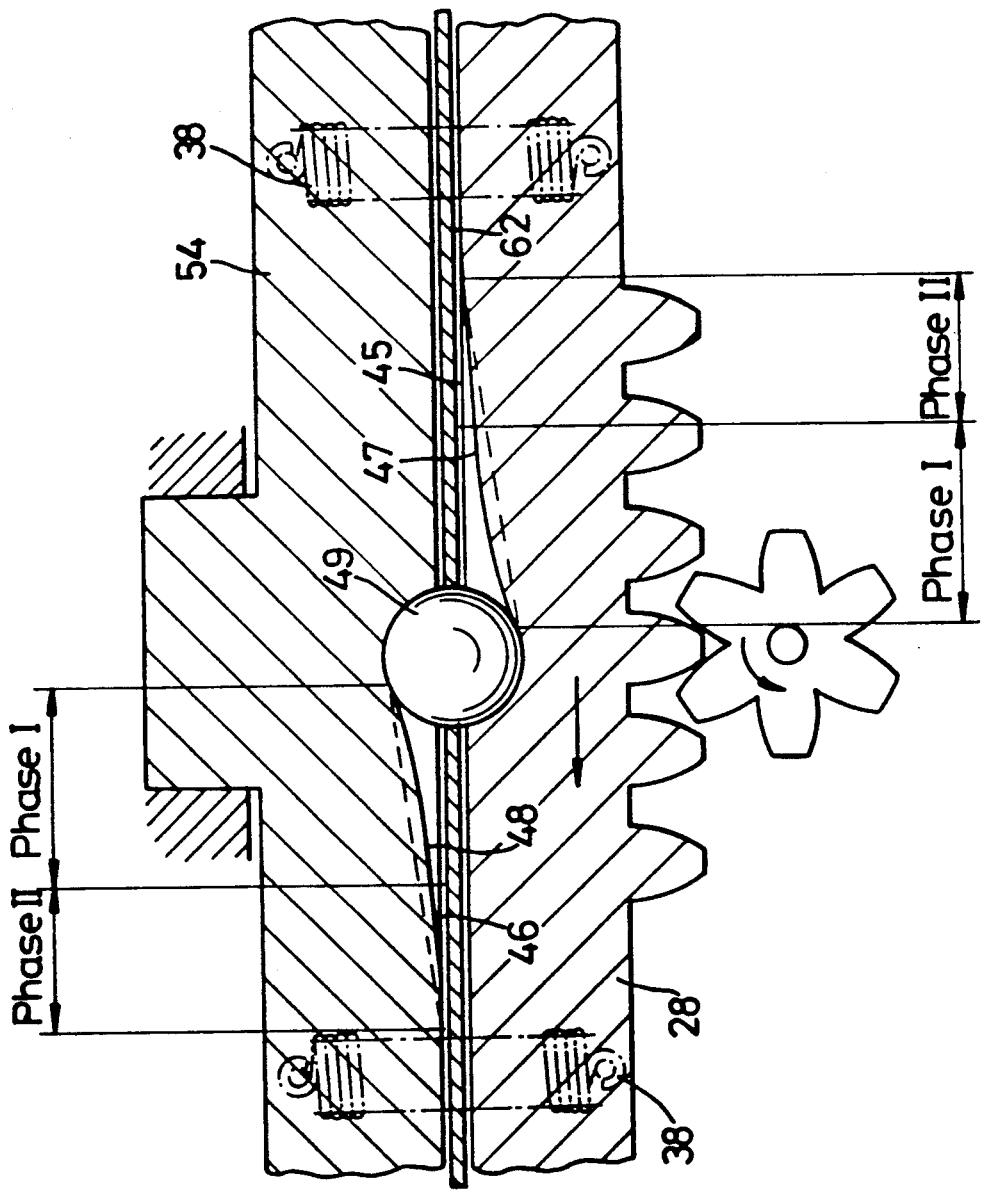
FIG. 10 is a section as FIGS. 8 and 9, illustrating the present invention.

FIG. 10 shows, in a view corresponding to those of FIGS. 8 and 9, a configuration of the grooves 47, 48 according to the present invention. The same reference numerals are used as in FIG. 8, and the FIG. 10 construction has the additional feature of a cage 62 disposed between the rings 54, 28, the balls 49 being constrained in apertures in the cage 62 so that the balls move in synchronism with one another.

The grooves 47, 48 in FIG. 10 have a pitch or inclination to the faces of their respective rings which varies along the length of the grooves. Starting from the deepest ends of the grooves, the pitch is at a maximum and then decreases over a length of the groove indicated as phase 1. Thus, during movement of the balls along the phase 1 portion of the groove, an increment of angular movement of the actuating ring relative to the abutment ring initially produces a large change of axial position of the actuating ring, but the change of axial position of the actuating ring becomes progressively smaller with further increments of angular movement thereof. Subsequently the balls reach a portion of the groove indicated as phase 2, in which the inclination of the grooves is constant so that in this phase increments of angular movement of the actuating ring produce constant but relatively small changes in the axial position thereof.

Figure 11:
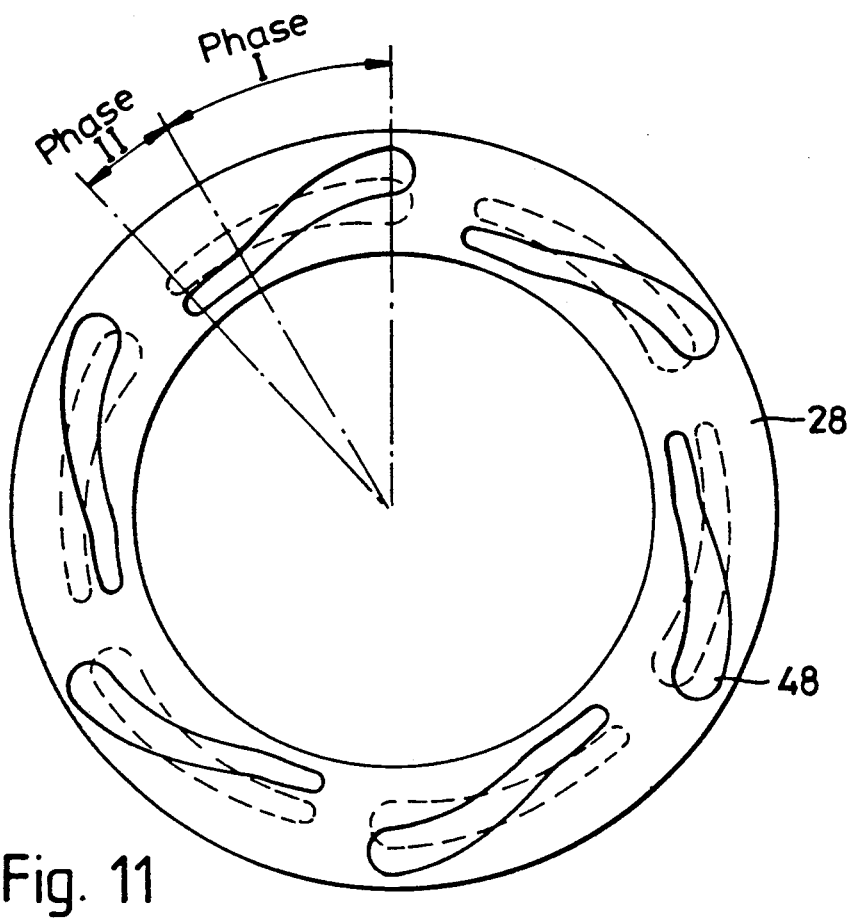
FIGS. 11 and 12 are axial views of part of the mechanism, illustrating modifications of the invention.

FIG. 11 shows an axial view of an alternative embodiment of the actuating ring 28. It has six circumferentially spaced grooves 48, which comprise portions (phase 1) which extend circumferentially and radially inwardly of the ring, and portions (phase 2) which extend solely circumferentially of the ring. If each of the grooves is of constant inclination along its length, there is obtained, by virtue of the changing radius of the grooves, a rate of change of axial position of the ring which decreases with rotation thereof in phase 1. In phase 2, the rate of change of angular position of the ring is constant. If required, it is possible to combine a change in inclination of the grooves along their length with a change in the radial disposition of the grooves to achieve a required relationships between the angular and axial positions of the actuating ring.

Figure 12:
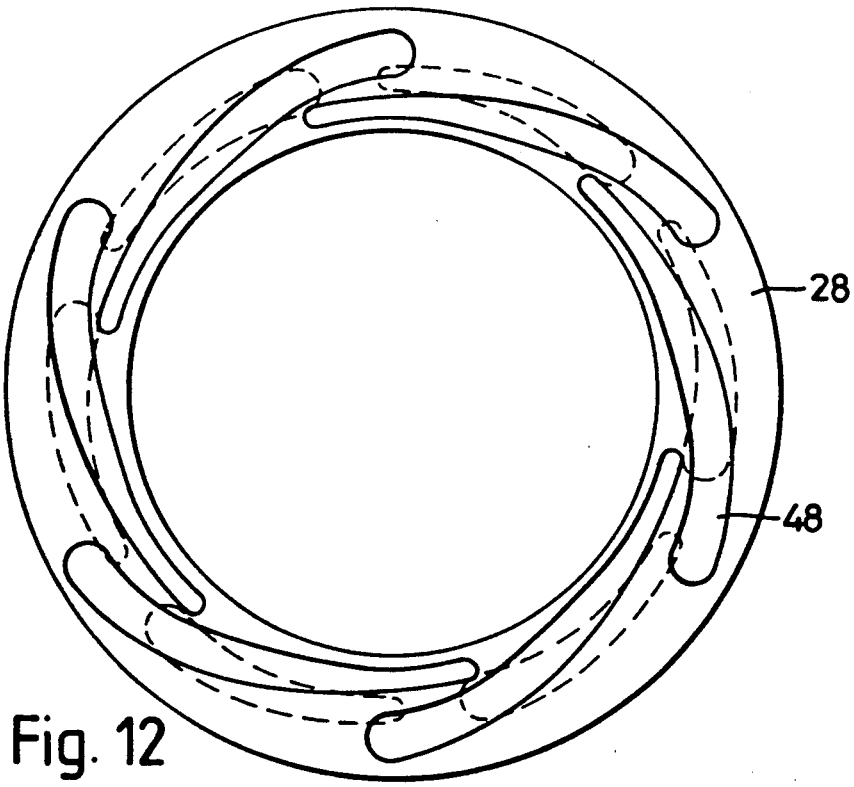

FIG. 12 is an axial view of a ring 28, wherein the grooves 40 extend radially as they extend circumferentially. Advantage has been taken of this to provide for the grooves 48 to overlap one another circumferentially, so that the grooves can be made longer and the possible angle of rotation of the ring 28 as the balls travel along the length of the grooves therein is increased. This enables a more sensitive control of the axial displacement of the adjusting ring relative to the angular movement thereof to be obtained.

What is claimed is:

1. A differential unit comprising:

a housing;

a drivable differential carrier supported in the housing for rotation about an axis;

two output elements rotatable about said axis relative to the different carrier and connected to respective output shafts;

differential gears rotatably supported by the differential carrier and having driving connection with the output elements to permit differential rotation thereof;

a friction assembly comprising a number of plates rotationally fast with one element of the differential rotatable about said axis, interleaved with a number of plates rotationally fast with another element of the differential rotatable about said axis, and actuating means for axially loading the plates into frictional engagement with one another to restrict said differential rotation of the output elements;

the actuating means comprising an abutment ring fixed relative to the housing, an actuating ring movable axially and angularly relative thereto, and means for causing axial movement of the actuating ring upon said angularly movement thereof;

said means comprising circumferentially extending cam surfaces in facing pairs, as grooves with interdisposed rolling elements operative between opposed faces of the abutment ring and actuating ring, said cam surfaces providing a relationship between the axial position of the actuating ring relative to the angular position thereof which is at least partially non-linear, such that from a starting position of the actuating ring the rate of change of axial position thereof as a function of angular movement thereof is initially high and then becomes lower so that there is no discontinuity between the non-linear cam surface phase and the subsequent linear cam surface phase.

2. A differential unit according to claim 1, further comprising an annular cage disposed between the actuating ring and abutment ring, the cage having apertures extending through it wherein the rolling members are received.

3. A differential unit according to claim 1, wherein said grooves have an inclination which is constant along the length of the groove, and at least part of each of the grooves contracts radially as it extends circumferentially.

4. A differential unit according to claim 3, wherein at least part of each of the grooves contracts radially as it extends circumferentially, and adjacent grooves in each ring overlap one another circumferentially.

5. A differential unit according to claim 1 wherein the actuating ring has an outer peripheral portion provided with teeth, engaged by a toothed pinion rotatable about an axis parallel to said axis.

6. A differential unit according to claim 5 wherein said teeth on the actuating ring and on the pinion are helical teeth.

7. A differential unit according to claim 5 comprising a motor and a reduction gearing for driving said pinion.

8. A differential unit according to claim 7 wherein said motor is an electric motor.

9. A differential unit according to claim 7 comprising a switchable free-wheeling unit provided in the driving connection between the motor and actuating ring, the free-wheeling unit being operable to lock the actuating ring against return movement thereof.

10. A differential unit according to claim 1 wherein the actuating ring is movable angularly through less than 180 degrees.

11. A differential unit according to claim 1 wherein the rotatable elements of the differential, with which the plates are respectively rotationally fast, comprise the output elements thereof.

12. A differential unit according to claim 1 wherein the rotatable elements of the differential, with which the plates are respectively rotationally fast, comprise the differential carrier and one of the output elements thereof.

* * * * *